Dec. 12, 1944.  L. G. DANIELS  2,364,697
VALVE
Filed Aug. 31, 1931  3 Sheets-Sheet 1

Inventor
Lee G. Daniels
By
Wilson, Dowell,
McCanna & Rehm
Attys.

Dec. 12, 1944.   L. G. DANIELS   2,364,697
VALVE
Filed Aug. 31, 1931   3 Sheets-Sheet 2
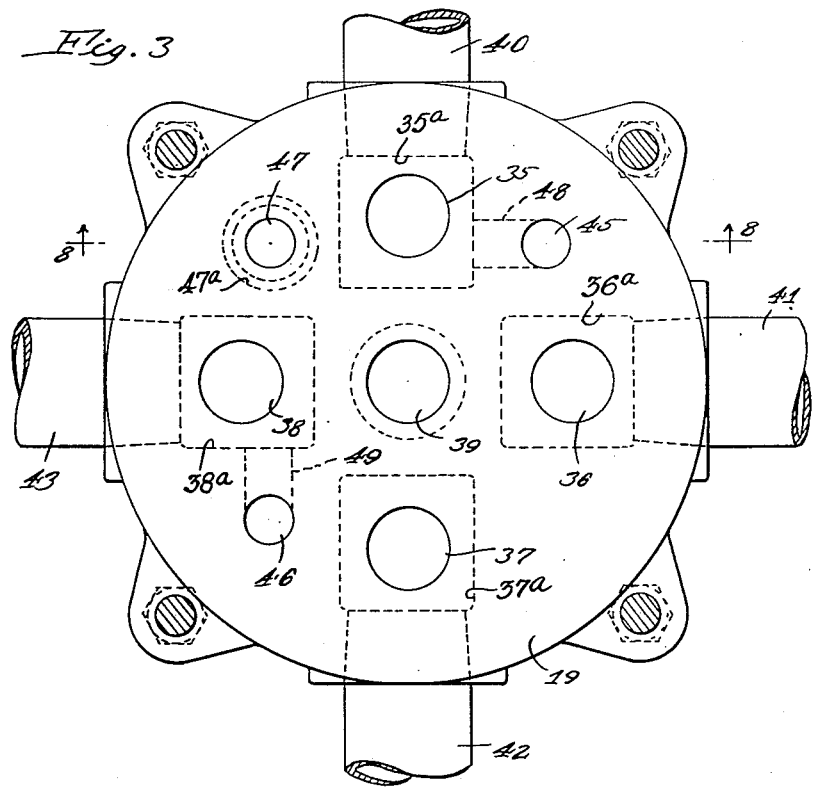
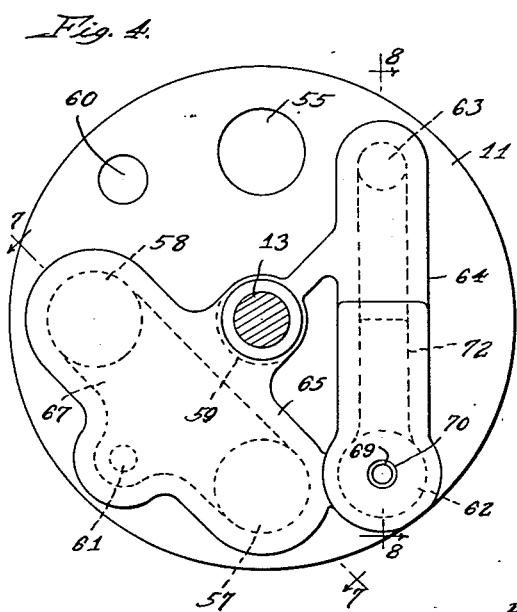
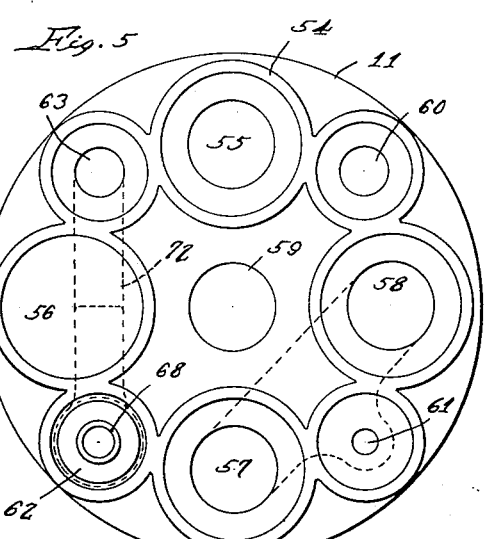
Inventor
By Lee G. Daniels
Wilson, Dowell, McCanna & Rehm
Attys.

Dec. 12, 1944.  L. G. DANIELS  2,364,697
VALVE
Filed Aug. 31, 1931  3 Sheets-Sheet 3

Inventor:
Lee G. Daniels
By Wilson, Dowell, McCanna & Rehm
Attys.

Patented Dec. 12, 1944

2,364,697

UNITED STATES PATENT OFFICE 2,364,697

VALVE

Lee G. Daniels, Rockford, Ill.

Application August 31, 1931, Serial No. 560,303

28 Claims. (Cl. 251—85)

This invention relates to valves and is particularly concerned with a multi-port, rotary plate type valve of a new and improved construction.

Valves of the kind referred to have heretofore been constructed so that the rotary plate had direct metal-to-metal contact with a seat provided on the body. This invariably gave rise to scoring and ultimately excessive leakage, so that frequent repairs or replacements were necessary, which, of course, meant considerable annoyance and expense. It is, therefore, the principal object of my invention to provide a valve of this kind in which the superimposed rotary plate is arranged to seat on a properly ported gasket provided on the body and made of rubber or other resilient material suitable for the purpose, whereby to minimize leakage. It is a further object of my invention to provide means for shifting the rotary plate in the operation of which the plate is first lifted or raised off the gasket and then turned to the preselected position desired, whereupon the same is seated again on the gasket, thus avoiding damage to the gasket in the turning of the plate and making for a very serviceable unit. A still further object is to provide a rotary plate with projecting seats for engagement with the gasket, so as to have the plate actually spaced from the gasket although seated thereon, thus making much less pressure active on the back of the plate to be overcome in the unseating thereof, besides giving a construction in which the seats by virtue of their projection are adapted to become impressed in the gasket for fluid tight seals.

Another object is to provide, in a valve of the kind mentioned, an index plate provided with a series of circumferentially spaced notches or slots to indicate the different positions of the rotary plate, and a lever for lifting, turning and reseating the rotary plate arranged to drop into either one of the notches or slots in the turning of the plate from one position to another, the rotary plate being spring pressed toward engagement with the gasket and the lever having a toe portion projecting therefrom arranged to serve as a fulcrum for the lever and to bear on the index plate at a point alongside the valve stem so that the rotary plate can be raised against the spring action by lifting up on the lever. Sufficient leverage is provided so as to enable the rotary plate to be raised or lifted easily by hand operation of the lever, even though a fairly heavy spring is provided for urging the rotary plate toward its seat on the gasket.

Other objects and advantages of my invention will be brought out in the course of the following description in which reference is made to the accompanying drawings wherein—

Fig. 3 is a horizontal section on the line 3—3 of Figure 1 giving a plan view of the gasket;

Fig. 4 is a horizontal section on the line 4—4 of Figure 1, giving a plan view of the rotary plate;

Fig. 5 is an under side view of said plate;

The same reference numerals are applied to corresponding parts throughout the views.

The valve of the present invention is adapted for a variety of purposes. While the same has been designed particularly for use with a water softener to control the flow of water for softening and backwashing, and to control the flow of brine and water in the salting and rinsing, it will soon appear that the valve could be used in connection with a filter to control the flow of water therethrough in filtering and backwashing, or could be used for industrial and other purposes, wherever it is desired to control the flow of any fluid in a similar manner. The reference to water softening hereinafter is, therefore, simply by way of illustration and is not to be regarded in any sense as a limitation on the application of the invention.

Figure 1:
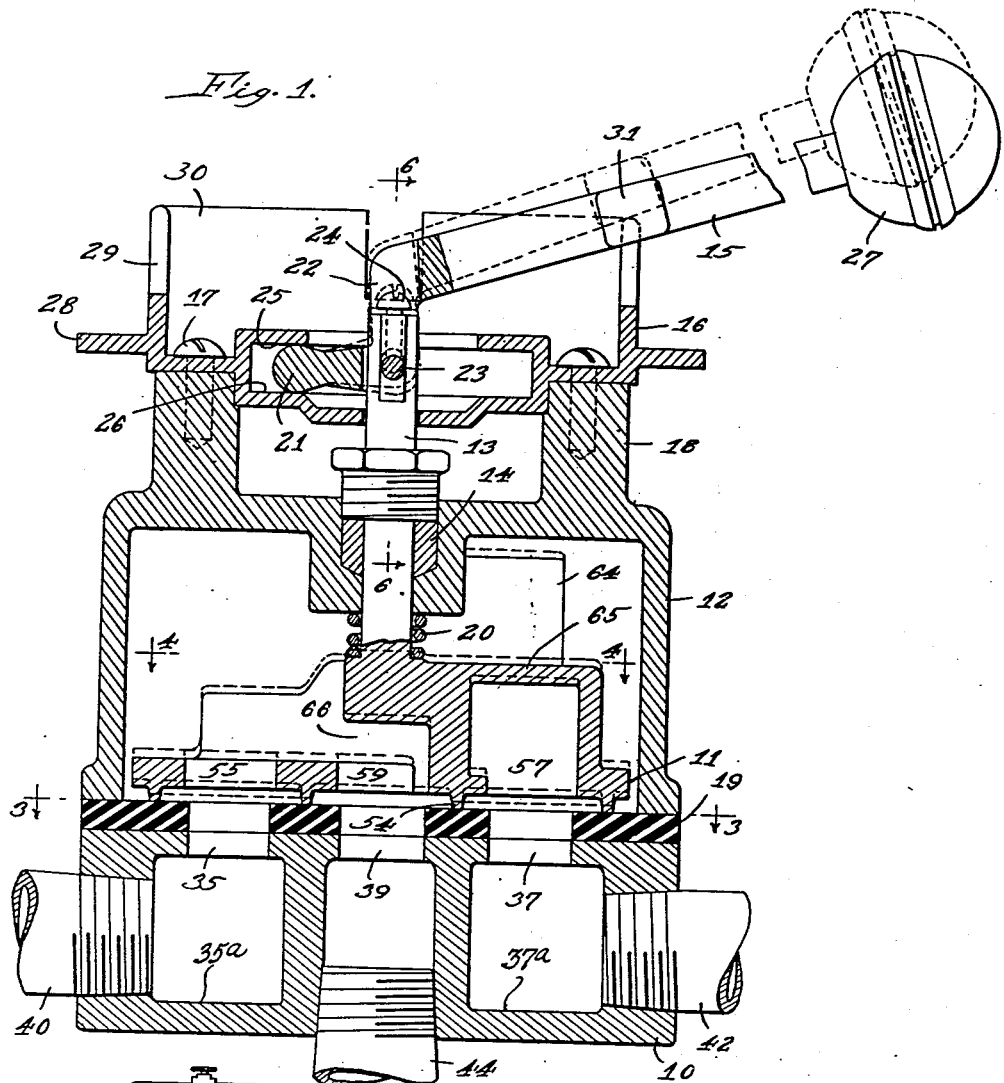
Figure 1 is a vertical cross-section through the middle of a valve made in accordance with my invention, the same being taken on the line 1—1 of Fig. 2.

Referring to the parts of the valve in a general way, the cast body of the valve is shown at 10 and is provided with a plurality of ports therein for cooperation with ports and passages in a rotary stem plate member 11 arranged in confronting relation thereto, whereby to control a system of communication between pipes connected with the body and communicating with the ports thereof. The body or multiported member 10, in other words, constitutes the stator and the stem plate 11, constitutes a multiported rotor. The disk-shaped or discoid plate 11 is enclosed by a cover 12 fastened, as will soon appear, onto the body 10. A valve stem 13 projects upwardly from the center of the plate 11 through a suitable stuffing box 14 provided in the cover to permit turning the plate by means of a hand lever 15, the position of which is indicated, as will soon appear, by the relationship of the lever to an index plate 16 secured as shown at 17 onto the lugs 18 projecting upwardly from the top of the cover 12. Valves of this general type, known as rotary plate type valves, have heretofore been constructed with the plate corresponding to the plate 11 held down in direct metal-to-metal contact with a flat seat provided therefor on the body. The turning of the plate while in such direct metal-to-metal contact with the body, invariably resulting in scoring the seat and as soon as that happened there was no longer a perfect seal, and leakage resulted. Once the seat became scored, it was only a question of time when the leakage became excessive and repair or replacement was necessary, which meant not only considerable expense but the annoyance of having service interrupted. I have, therefore, provided, in accordance with this invention, a thick disk-shaped or discoid gasket means 19 of rubber or other suitable sealing material placed on the flat top of the body 10 to provide a seat thereon for the plate 11 and having, of course, ports therein registering with the ports in the body so as to establish communication between the ports in the body and the ports and passages in the plate. The gasket means 19 manifestly enables me to secure a good leak-proof fit for the plate on the body, and it is not necessary to rely upon heavy pressure on the plate as was heretofore the case where a metal-to-metal contact was provided. The gasket is preferably cemented in place on the body 10 in confronting relation to the plate 11 so that it will not be apt to be lifted from the body when the plate is raised for shifting thereof, if the gasket tends to adhere to the plate. The plate is urged toward its seat and held seated by hydraulic pressure and by a short, stiff, coiled compression spring 20 fitting about the stem 13 between the plate 11 and the cover 12. Since this spring pressure comes directly at the center, it is obvious that the plate is held seated under a uniform pressure at all points circumferentially thereof. When the plate 11 is to be turned, it is first arranged to be raised or lifted clear of the gasket against the action of the spring 20 so that there will be no rubbing of the ported face of the plate against the top surface of the gasket, which would not only mean a considerable drag on the turning of the stem 13, but would naturally mean considerable wear and tear on the gasket. I have, therefore, provided the lever 15 with a toe portion 21 projecting forwardly from the forked end 22 of the lever which fits over the projetcing end of the stem 13 and is pivoted thereto by means of the cross pin 23 fixed in a transverse hole in the stem as indicated by the screw 24. The end of the toe portion 21 is rounded and has an easy working fit between upper and lower annular flat abutment bearing surfaces 25 and 26, respectively, provided on the index plate 16 in concentric relation with the valve stem 13. Thus, the plate 11 is arranged to be raised by lifting up on the lever 15 at the outer end thereof, where a suitable knob 27 is provided. The lever in such operation fulcrums on its toe portion 21 on the surface 26 and there is enough mechanical advantage due to the leverage in conjunction with the hydraulic counterbalancing force exerted in the open or intervening space provided by the projecting ring seats 54 to make it fairly easy to operate the valve in this manner. When the operator lets go of the knob 27, the plate 11 will ordinarily return to its seat on the gasket simply under the action of the spring 20, but in the event the spring does not exert sufficient pressure or it is desired to make sure that the plate 11 will be seated as firmly as possible on the gasket, the operator can bear down on the knob 27 to force the plate downwardly, using the same leverage as in raising the plate, the lever 15, in that case, being fulcrumed by means of its toe portion 21 on the bearing surface 25. The different positions of the valve are suitably indicated on lugs 28 projecting radially from the index plate 16 adjacent notches 29 provided in an upwardly projecting annular flange 30 formed on said plate. Accurate location of the valve is secured by having flats provided on the sides of the lever 15 as at 31 and making the lever fit fairly snugly in the notches 29. When the plate 11 is raised preparatory to turning the same, the lever 15 is lifted far enough to leave the notch 29 in which it was entered, as indicated in dotted lines in Figure 1, whereupon, the stem 13 can be turned by means of the lever in an obvious manner. In the turning of the stem, the lever can be allowed to ride on the edge of the flange 30, if desired, especially if it is being moved from position No. 1, indicated in Fig. 2, to position No. 2, or from position No. 2 to position No. 3; that is to say, if the valve is not being shifted from one position through an intermediate position to some other position.

The gasket 19, it should further be noted, serves not only as a seat for the rotary plate 11, but also as a gasket for the joint between the body 10 and cover 12, the cover being fastened in place by means of a plurality of bolts 32 extending through lugs 33 on the body and threaded in lugs 34 on the cover. The resilient gasket 19 is compressed at the margin thereof as the cover 12 is drawn down in the tightening of the bolts, thus providing a water-tight joint. This is important in the present construction particularly, because of the fact that the inside of the cover is at all times subject to the full pressure of the source of water supply, as will soon appear.

Figure 2:
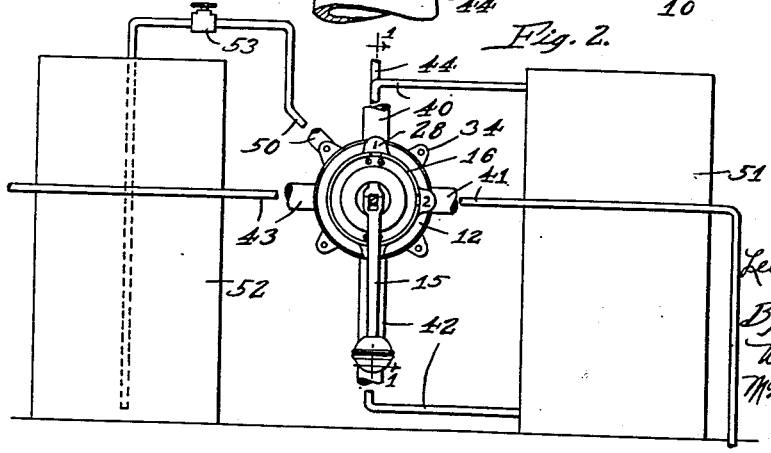
Fig. 2 is a diagrammatic view to illustrate the use of the valve in connection with a water softener and its brine tank.
Figure 6:
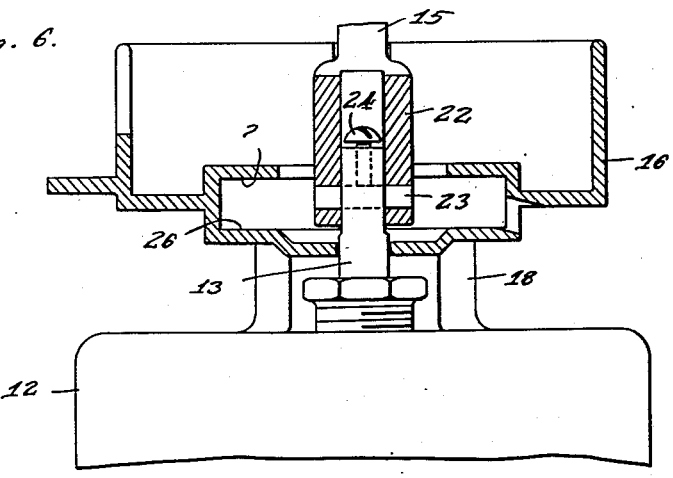
Fig. 6 is a vertical sectional detail on the line 6—6 of Figure 1.

In the description thus far, I have purposely omitted reference to any specific port arrangement in the body 10, as well as any specific arrangement of ports and passages in the plate 11 for the reason that those arrangements will be varied naturally accordingly to different requirements. The number of ports and passages provided will, in any case, depend upon the number of operating positions and the number of pipe connections whose intercommunication is to be controlled by the valve. The specific valve porting herein illustrated constitutes a highly satisfactory port arrangement for use in controlling the cycle of operation of a water softener. Four main ports, numbered 35 to 38, respectively, are provided in the body 10 in equally circumferentially spaced relation (90° apart) and at the same radius with respect to a central port 39 which constitutes the fluid pressure inlet, registering ports being provided in the gasket 19, as indicated. A top chamber 35ª communicates with the port 35 and a side chamber 36ª communicates with the port 36. Similarly, a bottom chamber 37ª communicates with the port 37 and a second side chamber 38ª communicates with the port 38. Pipes, numbered 40 to 43, radiate from the body and communicate with openings in the chambers 35ᵃ to 38ᵃ, respectively. A fifth pipe 44 extends from the center of the body and communicates with the port 39. There are three other smaller or intermediate ports in the body 10, numbered 45 to 47, respectively, and all disposed at the same radius with respect to the center port 39. The port 45 is midway between the ports 35 and 36 and communicates with the top chamber 35ᵃ and pipe 40 through a passage 48 in the body. The port 46 is midway between the ports 37 and 38 and communicates with the side chamber 38ᵃ and pipe 43 through the passage 49. The port 47 is midway between the ports 35 and 38 and has an intermediate chamber 47ᵃ communicating therewith having an opening for connection with a pipe 50. Now, in a typical water softener installation as shown in Fig. 2 where 51 represents a softener and 52 a brine tank, the pipe 44 is the hard water supply pipe, and the pipe 43 the service pipe for delivery of the soft water to the service system. The pipe 40 is connected with the top of the softener 51 and the pipe 42 with the bottom. The pipe 41 is the drain pipe leading to the sewer or other waste receiver, and the pipe 50 is the one leading from the brine tank. A separate hand operated shut-off valve 53 is provided in the last mentioned pipe connection for a purpose that will soon appear.

Figure 7:
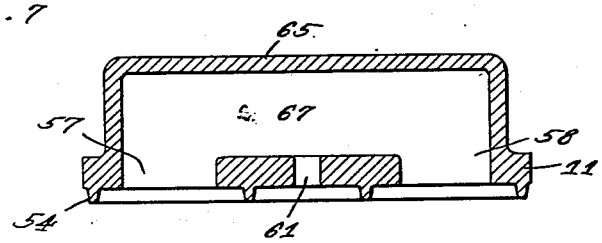
Fig. 7 is a vertical section on the line 7—7 of Fig. 4.

The rotary plate 11 carries a series of ring-shaped projections 54 on the ported bottom face thereof as best appears in Fig. 5, each circular projection bounding a shallow chamber or port in the plate and serving, by seating on and slightly impressing itself in the gasket to retain the gasket against local displacement in the zone of the ports, to seal the communication between the port associated therewith and a registering port in the gasket and valve body, and to cut off cross-communication. These projecting seats 54 are responsible for keeping the plate actually spaced from the gasket when the seats are engaging the gasket as clearly appears in Figure 1. As a result, the pressure of the line 44 is not active against the total area of the plate but only a small fraction of it, so that it requires a proportionately smaller force applied to the lever 15 to unseat the plate. The fact that the seats are formed by such narrow circular ribs or thin walls means a still further reduction in the pressure that is effective against lifting the plate, there being counterbalancing pressure within the seats. In other words, the only area on which the pressure of the line is effective and which must be overcome in lifting the plate, is the area of the narrow circular seats themselves. The counterbalancing above described occurs when the valve is in backwash position. When, however, the valve is in service position the area of the blind port or portion of the stem plate is added to the unbalanced area of the ring seats so that a somewhat greater force is required to unseat the valve in this position. The projecting rings 54 serve to space the members apart to provide an intervening space therebetween for the reception of water under pressure when the rotor plate is seated. There are four main ports, numbered 55 to 58, provided in the plate 11 correspondingly arranged to the ports 35 to 38 in the valve body. The port 55 may be considered a through port, the ports 57 and 58 open ports, and the port 56 a blind port or blind portion. Also a central port or passage means 59 communicating with the central port 39. That is to say, the ports 55 to 58 are all disposed at the same radius with respect to the central port 59 and register with the ports 35—38 in the different positions assumed by the plate, its positions being a quarter-turn or half-turn apart as will soon appear. Four other ports, halfway between the ports 55—58, numbered 60 to 63, are provided at intermediate positions, all on another radius with respect to the central port 59, the radius being the same as that for the intermediate ports 45 to 47 in the valve body, whereby to provide for registration of the intermediate ports 61 to 63 with the ports 45 to 47. Since the ports 55—58 and 60—63 are arranged as described, it is evident that the rings 54 will make an identical pattern in their impression upon the gasket in every position of the plate 11, the advantages in which must be self-evident. The ports 55 and 60 extend through the plate 11 so that when these ports register with any ports in the valve body, there is open communication between those ports in the valve body and the interior of the cover 12, see Figure 1. The central port or passage means 59 comes directly under the stem 13 as clearly appears in Figure 1, but the stem is joined by webs, as indicated, to the bosses 64 and 65 provided on the top of the plate 11, whereby to provide a passage 66 in the plate below the stem to afford communication between the central port 59 and the inside of the cover 12. The boss 65 is hollow and affords a passage 67 therein to establish intercommunication between the open ports 57, 58 and vent port 61, see Fig. 7. The port 61 is provided simply to avoid the condition of water being trapped in the ring on the plate at this point when the plate is brought down on the gasket with the port 61 disposed between the ports 36 and 37 in the gasket, see Fig. 3, it being evident that trapping of a slug of water under the plate at a "dead" port would prevent seating of the plate firmly, and especially impressing the rings on the plate into the gasket. The boss 64 has an injector nozzle 68 threaded therein and disposed with its outlet end in the port 62. A jet tube 69 is threaded in a hole 70 in the boss 64 for the delivery of water under pressure from inside the cover 12 through the port or orifice of the jet tube 69 and the nozzle 68 whereby to create suction in the chamber 71 provided in the boss 64 behind the nozzle 68. A second or transfer passage 72 on the plate 11 is formed in the boss 64 to establish communication between the chamber 71 and the port 63. The port 56 is a blind port or blind portion defined by a ring-shaped projection 54 like any other of the ports 55, 57 and 58 of the same group, the object being to thereby provide for the engagement of these ring-shaped projections in four ring-shaped depressions that will be created thereby in the gasket 19, regardless of the position of the valve. In other words, the plate 11 seats in exactly the same way, and makes an identical pattern on the gasket in every position; if the ring-shaped projections 54 makes any imprints in the gasket 19, there will be the same depth and diameter of imprint at each of the four places where registration is made with the ports 35—38 in the valve body and likewise the same depth although different diameter of impression at each of the four places between those ports. The port 56, although it is a "blind" port, doesn't prevent seating of the plate by trapping of water, because it registers with a "live" port in the gasket in every position of the plate, that is, either one of the ports 35—38.

Figure 8:
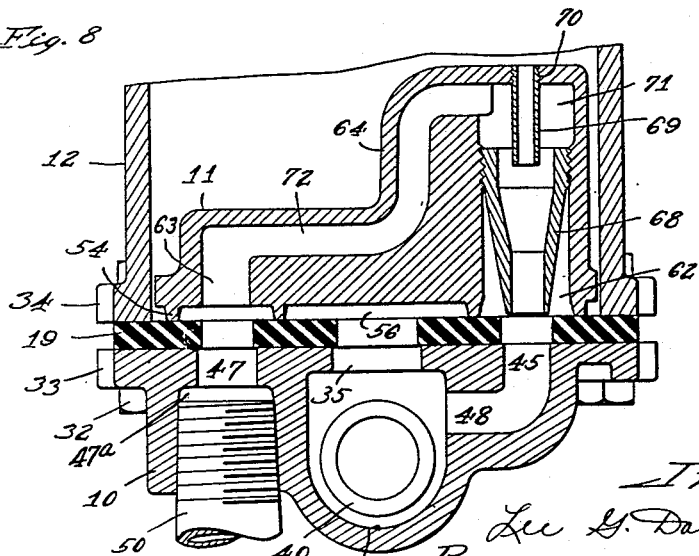
Fig. 8 is a fragmentary vertical section through the valve with the rotary plate in salt wash position, said figure amounting to a section on the line 8—8 of Figs. 3 and 4.

In operation, assuming that the valve is being used in connection with the water softener 51 and brine tank 52, and that the lever 15 is in the No. 3 position, indicated in Fig. 2, hard water is delivered through the pipe 44 and flows through pressure inlet port 39 and passage 59 and through ports 55 and 35 into the pipe 40 for passage downwardly through the bed of water softening material in the softener 51. The softened water discharged from the bottom of the softener through pipe 42, flows through ports 37 and 57 and passage 67 through ports 58 and 38 for delivery through the pipe 43 to the service system. The port 60 is in communication with the port 47 so that, if any water is needed in the brine tank 52, it can be delivered through pipe 50 to said tank by opening the valve 53. When the desired amount of water has been drawn, the valve will, of course, be closed. In other words, the operator can at any time during normal softening operation replenish the water supply in the brine tank so as to be sure that there will be brine available for regeneration when that becomes necessary. The softening operation is continued until the bed of water softening material requires regeneration, whereupon the lever 15 is operated to lift and turn the valve a half-turn in a clockwise direction to the No. 1 position and to reseat the valve to subject the bed of water softening material to a backwash, that is, an upflow of water, whereby to get rid of any deposit of foreign matter off the top of the bed and, at the same time, break up the bed so that regeneration thereof may be more easily and effectively carried out. In this backwash, hard water is delivered by the pipe 44 for passage through ports 39, 59, 55 and 37 to pipe 42 so as to flow upwardly through the softener 51. The water discharged from the top of the softener 51 through pipe 40, carrying with it the foreign matter referred to, is discharged through ports 35 and 57, passage 67, and port 58 and drain or waste port 36 into the pipe 41, to be conducted to the sewer. The backwash is carried on for a stated time and then the lever 15 is operated to shift the valve a quarter turn in a clockwise direction to the No. 2 position for what is known as the salt wash, or salting and rinsing. In this position, which is well illustrated in Fig. 8, water is delivered under pressure from inside the cover 12 through the port of the jet tube 69 through the injector nozzle 68 and port 62 into the port 45 for delivery through passage 48 into the pipe 40 leading to the top of the softener 51. Now, the brine valve 53 is opened at this point to permit the withdrawal of brine from the brine tank 52 through the pipe 50. Hence, the reduction in pressure created in the chamber 71 results in the entraining of brine with the water, the brine being delivered through pipe 50, ports 47 and 63, and passage 72 to the injector nozzle 68. The brine delivered to the softener 51 passes downwardly through the bed of water softening material therein to regenerate the same, the spent brine together with liberated calcium and magnesium is discharged from the softener through pipe 42 and conducted through ports 37 and 58, passage 67, and ports 57 and 36 into the pipe 41 for delivery to the sewer. The salt wash is continued for a stated time or until a certain drop in level is noted in the brine tank, indicating that a certain stated amount of brine has been used sufficient for complete regeneration of the softener, whereupon the valve 53 is closed to shut off the flow of brine. When there is no further flow of brine, it is obvious that the hard water can still flow through the tube 69 and injector nozzle 68 for delivery to the softener by way of the pipe 40 for rinsing the bed, and that the rinse water leaving the bottom of the softener through pipe 42 will be conducted in the same way as the spent brine through the waste pipe 41 to the sewer. The valve is left in the No. 2 position long enough to complete the rinsing, after which the lever 15 is operated to lift and turn the valve a quarter-turn in a clockwise direction back to the No. 3 position to resume the softening operation previously described. After the valve is brought back to the No. 3 position, the water supply in the brine tank 52 is replenished in the manner previously described.

It should be clear that in the operation of the valve, the raising or lifting of the plate 11 and the reseating or lowering thereof back to its normal position cannot result in any undesirable cross-currents. It will also be clear that upon each lifting operation of the plate 11, the pressure in the cover will be relieved, which makes it easier to turn said plate. Upon each such lifting and turning of the plate 11 there will only be a slight discharge of hard water through the waste outlet pipe 41, in view of the fact that the supply pipe 44 is, at such times, placed in direct communication with the pipe 41 as is thought to be self-evident. The port arrangement in the body 10 and plate 11 is such that it is always possible to draw water in the service system. That is to say, hard water is by-passed to the service system when the valve is in either the No. 1 or No. 2 position. When the valve is in the No. 1 position, the blind port 56 is over the port 38, closing the same, but the port 63 is in register with the port 46. Hence, hard water can be by-passed to the service pipe 43 by discharge from the inside of the cover 12 through the jet tube 69 and passage 72 to the port 63, from whence there is direct delivery through port 46 and passage 49 to the service pipe 43. The flow is, of course, restricted somewhat owing to the restriction of the tube 69 but, of course, the valve is left in the No. 1 position for such a short time that there is no objection. When the valve is in the No. 2 position, the port 55 is in register with the port 38 and the port 60 with the port 46, so that there is good delivery of hard water from inside the cover 12 substantially directly to the service pipe 43.

It is believed the foregoing description conveys a good understanding of all of the objects and advantages of my invention. The appended claims have been drawn with a view to covering all legitimate modifications and adaptations.

I claim:

1. In a valve of the class described, the combination of a body member constituting the stator, a rotary plate arranged to be turned with respect to the body member and constituting the rotor, gasket means of resilient material on one of said members arranged to engage a ported face on the other of said members to provide different communication between the body member and plate in different positions of the plate, spring means for yieldingly urging the plate into contact with the body member to provide substantially leak-proof communication, an operating stem projecting from said plate for the turning thereof, a lever connected with the stem for turning the same, and means for raising the plate off the body member against the action of said spring means when the same is to be turned, said means including abutments in fixed relation to the body member and arranged to have the lever fulcrum thereon in opposite directions in a vertical plane, whereby to permit positive raising and lowering of the plate by the same lever used in turning the same.

2. In a valve of the class described, the combination of a body member having a plurality of ports provided therein, a rotary plate superimposed on the body member having ports provided therein for register with ports in the body member in different positions thereof, a cover on the body member enclosing said plate, a stem for turning the plate projecting therefrom through the cover, a lever pivotally mounted on the projecting end of said stem on a transverse axis, whereby to permit turning of the stem and plate by lateral movement of the lever, and a stationary abutment for said lever adjacent the projecting end of said stem with relation to which the lever is arranged to fulcrum for rocking movement in either direction in a vertical plane, whereby to permit raising of the plate off the body member by movement of the lever in one direction and forcing the plate downwardly onto the body member by movement of the lever in the opposite direction.

3. A valve as set forth in claim 2 including a central flat ported gasket interposed between the body member and the plate member and fastened to one of said members with its ports in register with the ports of said member.

4. In a valve of the class described, the combination of a body member having a plurality of ports therein, a rotary plate superimposed on the body member having ports provided therein to register with certain ports in the body member in different positions of said plate relative thereto, a cover on the body member enclosing said plate, spring means normally urging the plate toward its seat on the body member, a stem for turning the plate projecting upwardly therefrom through the cover, a lever for turning the stem pivoted on the projecting end thereof on a transverse axis for movement in a vertical plane, said lever being arranged to turn the stem by lateral movement, an index plate providing a plurality of circumferentially spaced notches therein for reception of the lever in different positions of the stem, whereby to indicate the positions of the plate, an annular abutment on said plate about the projecting end of said stem, a toe portion on the inner end of said lever extending forwardly therefrom for engagement on said abutment, said plate being thereby arranged to be raised off the body member by lifting of the outer end of the lever out of the notch in the index plate and being arranged to be turned by lateral movement of said lever after it is raised clear of the notch, and a second annular abutment on the index plate about the projecting end of said stem for cooperation with the toe portion of the lever in forcing the plate downwardly toward the body member by means of the lever.

5. A rotary plate type valve comprising a body, and a plate superimposed thereon and arranged to be turned with respect thereto, the body having a central port and a set of four equally circumferentially spaced ports all at a predetermined radius with respect to the central port, the plate having passage means therein extending completely therethrough and adapted to register with the central port in the body when the plate and body are in superimposed relation, and said plate having three ports and a blind portion on the same radius with respect to the center of the plate as the set of four ports in the body, the three ports and blind portion being spaced circumferentially the same as the ports in the body, the first of the three ports extending completely through the plate, and said plate having a passage therein interconnecting the second and third ports.

6. A rotary plate type valve comprising a body, and a plate superimposed thereon and arranged to be turned with respect thereto, the body having a central port and a set of four equally circumferentially spaced ports all at a predetermined radius with respect to the central port, said body member also having two other ports on a given radius with respect to the central port, the one being intermediate a first and second port of the set of four in the body and having a passage establishing communication with the first port, and the other being intermediate the first port and a fourth port of the set of four in the body and extending completely through the body, the plate having passage means therein extending completely therethrough and adapted to register with the central port in the body when the plate and body are in superimposed relation, said plate having three ports and a blind portion on the same radius with respect to the central port as the set of four ports in the body, the three ports being spaced circumferentially the same as the ports in the body, the first of the three ports extending completely through the plate, said plate having a passage therein interconnecting the second and third ports, and said plate having two intermediate ports provided therein at the same radius with respect to the center of the plate as the intermediate ports in the body and spaced apart the same distance as the intermediate ports in the body so as to register therewith, the two last named ports being interconnected by a passage provided in the plate, an injector nozzle in one of said ports communicating through said last-mentioned passage with the other port, and a jet tube on said plate concentrically disposed with respect to the injector nozzle, said tube having its inlet end opening on the back of the plate and its outlet end arranged to discharge through the nozzle.

7. In a valve comprising multiple port members, a resilient gasket secured to the face of one of said members, the one member being stationary, and the other being rotatable to bring different ports together, a lever for lifting, turning and positively reseating the rotatable member whereby to prevent any relative lateral movement of the contacting surface of said member on the coacting surface of the other member, and an index plate having surfaces for the lever to bear against when it is lifting the rotatable member, to slide on when it is turning said rotatable member and to bear against when it is reseating the rotatable member.

8. In a plate type multiple port valve, comprising two members having multiple ports, a resilient gasket between them and secured to the stationary member, the movable member having rings around its ports adapted to press into the resilient gasket to seal off one port from another, and means compelling the movable member to be lifted off its seat before it can be moved to another position.

9. In a plate type multiple port valve, comprising two members having multiple ports, a resilient gasket between them and secured to the stationary member, the movable member having rings around its ports adapted to press into the resilient gasket to seal off one port from another, a lever for lifting the movable member off of its seat and turning it to the next position, and an index plate having slots for locating the lever and a surface for the lever to slide on when moved from one slot to another.

10. In a plate type valve, the combination of a ported body member, a fluid tight cover on the body member, a ported stem plate inside the cover and shiftable to different positions on the body member, one of the ports in the body member being a pressure port and certain other ports therein being arranged to communicate therewith in certain positions of the stem plate, the pressure port having communication with the inside of the cover, a gasket of resilient material disposed on the body member having ports in register with the ports in the body member, said stem plate having projecting seat portions surrounding the ports thereof and adapted to be impressed in the yielding material of the gasket for fluid tight seals and also hold the stem plate in spaced relation to the gasket while seated, and means for unseating and moving the stem plate to different positions relative to the body member.

11. In a plate type multiple port valve comprising a body member having multiple ports, and a rotary stem plate member having ports arranged to register with the ports in the body, resilient gasket means on one of the two members just mentioned, means for lifting the plate and turning the same and thereafter seating the same in a different position to change the registration of the ports in the plate with the ports in the body, the said gasket means being fixed on the one member, and the other member having projecting seats for impression in the yielding material of the gasket means when the plate is seated, and means for predetermining a series of different positions of the plate with respect to the body, the aforesaid seats being so formed and related to produce a substantially identical pattern on the gasket means in every position of the plate, whereby to insure the same sealing engagement of the plate with the body in all positions.

12. In a valve of the type described, comprising two multiple port members, one of which is rotatable relative to the other, and a resilient gasket between them, and secured to the face of one of said members, the other of said members having rings around the ports thereof arranged to press into the gasket to seal communication between registering ports in said members, means compelling the member that is rotatable to be first lifted out of contact with the other member before it can be rotated, whereby to prevent any relative lateral movement between the surfaces of the members when in contact.

13. In a plate type valve, the combination of a ported body member, a ported stem plate member adapted to be unseated and seated in different positions of the body member to effect different communication between the ports of the body member in different positions of the plate member, a cover on the body member enclosing the plate member, one of the ports in the body member being a pressure port and having communication with the inside of the cover, one of the first two mentioned members having gasket means thereon and the other having projecting seat portions for engagement with the gasket means when the plate member is seated, whereby to provide fluid tight seals and hold the plate member in spaced relation to the body member although seated, and means for lifting and turning the plate member.

14. In a plate type valve, having two multiple port members, one member being adapted to be moved relative to the other to different operative positions, and one member having projecting seats around its ports for engagement with the other member to close communication between registering ports, said seats serving to hold the members in spaced relation when engaged, for the purpose described, said seats being of small width so as to lessen the area of contacted surfaces when the members are engaged, for the purpose described, resilient gasket means on the contacting face of one of said members and adapted to have the projecting seats engage and impress themselves therein and means for lifting, turning and reseating the movable member.

15. A lift-turn type valve, comprising: two multiple ported members, a stator member and a rotor member; a cover secured to said stator member and enclosing said rotor member; means for introducing fluid under pressure into said cover; ported resilient sealing means on the face of one member in confronting relation to the face of the other member; raised ring seats carried on the face of the other member around the ports therein, to cooperate with the sealing means in sealing the connecting ports together when the members are in seated relation and to provide open space between the members for balancing fluid under pressure, means including a lever for lifting and turning said rotor member to preselected position; and means for preventing turning of said rotor member until it has been unseated.

16. A valve comprising two cooperative members, a discoid rotor having a flat face with ports therein, and a stator having a flat face with ports therein, the rotor being adapted to rotate about its axis and also to move along its axis, the ports in the rotor being adapted to register with the ports in the stator face, openings adapted to receive conduits for different liquids and in communication with the stator ports, the stator and the rotor being adapted in suitable angular positions of the rotor to establish communication through the valve openings for controlling a plurality of different liquid flows, a detachable member on the stator forming a chamber enclosing the rotor, a discoid ported gasket of soft resilient material of the nature of soft rubber interposed between rotor and stator, means for putting the rotor under a yielding pressure tending to force the rotor, stator and gasket together to form a tight seal in all the valve positions but normally preventing the rotor from being rotated without injury to the gasket, actuating means adapted both for moving the rotor axially a short distance away from the stator and also for rotating the rotor while moved away from the stator, said actuating means being adapted in operation to counteract said pressure thus relieving pressure from the gasket to permit free rotation and to prevent injury to the gasket, but permitting pressure to be exerted upon the gasket in each of the valve positions to maintain the seal, the disc face of the rotor being provided with shallow chambers adapted to retain the gasket.

17. A valve comprising: a body having a top chamber, a bottom chamber and two side chambers, each of said chambers being provided with an opening for connection with a pipe, said body having a face provided with a set of four main ports, each of said main ports communicating with one of said chambers; a stem plate arranged in confronting relation to said face of said body; a cover secured to said body and enclosing said stem plate; means for introducing fluid under pressure into said cover, said stem plate having three main open ports and a blind portion for cooperation with the four main ports of said body, the main ports of said body and stem plate being formed upon substantially equal radii and having substantially the same angular spacing; means on said stem plate providing an enclosed passage interconnecting the open main port nearest said blind portion and the next adjacent open main port, the remaining open main port being a through-port extending completely through said stem plate and being located intermediate said enclosed passage and said blind portion, said stem plate being movable into a plurality of operative positions including a first position in which said enclosed passage interconnects the bottom chamber and one of said side chambers and the blind portion closes the other side main port and the through main port establishes communication between the top chamber and the interior of said cover, a second position in which said enclosed passage interconnects said top chamber and one of said side chambers and said blind portion closes the other side main port and the through main port establishes communication between the interior of the cover and bottom chamber, and a third position in which said enclosed passage interconnects said bottom chamber and one of said side chambers and said blind portion closes the main port of said top chamber and said through main port establishes communication between the interior of said cover and the other of said side chambers.

18. A valve comprising: a body having a top chamber, a bottom chamber and two side chambers, each of said chambers being provided with an opening for connection with a pipe, said body having a face provided with a set of four main ports, each of said main ports communicating with one of said chambers, said face also being provided with at least two intermediate ports, one of said intermediate ports communicating with one of said side chambers and another intermediate port communicating with said top chambers; a stem plate arranged in confronting relation to said face of said body; a cover secured to said body and enclosing said stem plate; means for introducing fluid under pressure into said cover, said stem plate having three open main ports and a blind portion, for cooperation with the four main ports of said body; means on said stem plate providing an enclosed passage interconnecting the main port nearest to said blind portion and the next adjacent open main port, the remaining open main port being a through-port extending completely through said stem plate and being located intermediate said enclosed passage and said blind portion, said stem plate also having an intermediate port extending completely therethrough, said intermediate port being adapted to register in one operative position of said stem plate with the intermediate port of said body communicating with one of said side chambers to establish communication between said side chamber and the interior of said cover, and in another operative position with the intermediate port of said body communicating with said top chamber to establish communication between said top chamber and the interior of said cover.

19. A valve comprising: a body having a top chamber, a bottom chamber and two side chambers, each of said chambers being provided with an opening for connection with a pipe, said body having a face provided with a set of four main ports, each of said main ports communicating with one of said chambers, said face also being provided with at least two intermediate ports, one of said intermediate ports communicating with one of said side chambers and another intermediate port communicating with said top chamber; a stem plate arranged in confronting relation to said face of said body; a cover secured to said body and enclosing said stem plate; means for introducing fluid under pressure into said cover, said stem plate having three open main ports and a blind portion, for cooperation with the four main ports of said body; means on said stem plate providing an enclosed passage interconnecting the open main port nearest to said blind portion and the next adjacent open main port, the remaining open main port being a through-port extending completely through said stem plate and being located intermediate said enclosed passage and said blind portion, the stem plate being movable into a plurality of preselected positions in each of which said enclosed passage connects a side chamber of the body with a top chamber or a bottom chamber thereof, said stem plate also having an intermediate port extending completely therethrough, said intermediate port being adapted to register in one operative position of said stem plate with the intermediate port of said body communicating with said top chamber to provide a passageway establishing communication between the interior of said cover and said top chamber; and injector means in said passageway.

20. In a valve, the combination of a body member having a top port, a bottom port and two side ports, each of the ports communicating with an opening having a pipe connection, a cover secured to said body, a fluid pressure inlet communicating with the inside of said cover, a stem plate having multiple ports therein for registering with the ports in said body in preselected positions, said stem plate having through-ports extending completely therethrough, means on said stem plate providing an enclosed passage interconnecting certain of said stem plate ports, said stem plate being arranged to be lifted, turned and reseated in the preselected positions in each of which said enclosed passage serves to connect a side port of the body with a bottom port or a top port thereof, projecting ring seats carried by one of the members around the ports therein to provide open space for fluid under pressure between the members when in seated relation, a stem secured to said stem plate and extending therefrom through said cover, a lever attached to said stem for lifting and turning said stem plate, and means for compelling said stem plate to be lifted before the turning thereof.

21. A valve comprising: a body member having a plurality of separate chambers formed therein, each of said chambers being provided with an opening for connection with a pipe, said body member having a face provided with ports, said ports communicating with said chambers, a stem plate member arranged in confronting relation to said face of said body member; a cover secured to said body member and enclosing said stem plate member; means for introducing fluid under pressure into said cover, said stem plate member having a plurality of ports and a blind portion cooperable with the ports of said body member; resilient sealing means disposed between said body and stem plate members, said stem plate member being arranged to be lifted, turned and reseated relative to said body member to change the fluid flows through the ports in the body member; and projecting ring seats around the ports of one member to provide space of substantial area for fluid under pressure between the members when in seated relation, whereby the force required to lift said stem plate member from a seated position is reduced.

22. A lift-turn type valve, comprising: a multiported stator member; a multiported rotor member; said rotor member being arranged for movement toward and from and rotatively with respect to said stator member to enable selected ports of the rotor member and stator member to be brought into registration for the flow of fluid therethrough; projecting means carried by one of said members arranged in surrounding relation to the ports of said one member for maintaining said members spaced apart when in seated relation, to provide an intervening space open for the entrance of balancing fluid between said members; resilient sealing means for preventing leakage between the openings of said registered ports and said intervening space; and means for actuating the rotor member including means for lifting, turning and reseating the rotor member.

23. A lift-turn valve, comprising: a multiported stator; a cover on said stator providing a chamber; a multiported rotor in said chamber; the rotor and stator having faces arranged in confronting relation, means for introducing fluid under pressure into said chamber, whereby said rotor is hydraulically urged toward said stator; means for moving said rotor axially and rotatively with respect to the stator to effect registration between selected rotor and stator ports; resilient means between the confronting faces of the rotor and stator for preventing fluid leakage between the rotor and stator; and means spacing the rotor and stator apart when the rotor is in seated relation to provide an intervening space communicating with said chamber for the establishment of a hydraulic counter-pressure in opposition to the seating pressure on the rotor, whereby unseating of the rotor is facilitated.

24. In a plate type valve, the combination of a body member having a center receiving port, outlet ports and a return port, all of these being spaced an equal distance from the center port; passages communicating with said ports and adapted for connection to pipes; a stem plate having multiple ports adapted to register in preselected positions of the stem plate with the ports in the body member, the body member being also provided with an intermediate port and a passage communicating therewith and adapted to serve in one position of the stem plate as an inlet and in another position as an outlet, the center receiving port in the body being a pressure port and certain other ports therein being arranged to communicate therewith in certain positions of the stem plate; a cover on the body member enclosing the stem plate; means for lifting, turning and reseating the stem plate, the inside of the cover being subject when the stem plate is seated to pressure from the center pressure port; and a drain port in the body arranged to be opened to the inside of the cover in the lifting of the stem plate, whereby to relieve the pressure in the cover.

25. A lift-turn plate type valve, comprising: a multiple ported body member; a cover attached to the body member; a multiple port stem plate member enclosed by the cover; a fluid inlet communicating with the inside of the cover, the stem plate being arranged to be lifted, turned and reseated in preselected positions in relation to the body member; one of the members having a flat face and the other member having projecting ring seats around the ports therein for forming a connection around each of the ports of the one member in each seated position of the members, and also for providing an open space between the members, for the purpose described; a stem secured to the stem plate and extending therefrom through the cover; a lever pivotally attached to the stem, the lever including a toe portion; a flat surface parallel to the flat face of the one member and adjacent to the stem and against which the toe portion of the lever is adapted to bear when lifting the stem plate and upon which it is adapted to slide when turning the stem plate; a spring for seating the stem plate; and slots adjacent the flat surface for retaining the lever in each preselected position.

26. In a plate type valve, a body member having a plurality of ports therein; a cover attached to the body member; a disk-shaped stem plate member enclosed by the cover; a spring for urging the stem plate member towards the body member; a fluid pressure inlet communicating with the inside of the cover, the stem plate member having a plurality of ports and being arranged to be lifted, turned to preselected positions and reseated relative to the body member for directing and controlling the flow of fluid through the ports in the body member; means resiliently sealing the ports against leakage and providing space between the members for the entrance of fluid under pressure, when the stem plate member is in seated relation to the body member, whereby to reduce the force required to lift the stem plate member relative to the body member, said means including raised seats carried by one of the members around the ports therein, the raised seats being small in radial wall thickness relative to their diameter to increase the unit sealing force; and means for actuating the stem plate member including means for lifting, turning and reseating the stem plate member.

27. A lift-turn type valve, comprising: a stator member and a rotor member both having multiple ports therein, the members having opposed faces, the rotor member being arranged to be lifted, turned to preselected positions and reseated relative to the stator member; resilient means between the members for preventing leakage around the ports thereof when the rotor is seated, a cover on the stator member enclosing the rotor member; a fluid pressure inlet communicating with the inside of the cover, the fluid pressure tending to hold the rotor member seated; projecting means for maintaining the members spaced a definite distance apart when the rotor member is seated, the rotor member having a substantial area of its opposed face subjected to a counterbalancing fluid pressure, whereby the force to unseat the rotor member is reduced; and means for operating the rotor member for lifting, turning and reseating the rotor member, said means including a spring urging the rotor member toward the stator member.

28. A lift-turn type valve, comprising a multiple ported body member, a multiple ported rotor member, said members having opposed faces, the rotor member being arranged to be lifted, turned to preselected positions and reseated relative to the body member; a cover on the body member enclosing the rotor member; a fluid pressure inlet communicating with the inside of the cover, the fluid pressure tending to hold the rotor member seated; means for spacing apart substantial areas of said opposed faces to provide an open counterbalancing pressure space and resiliently sealing the connecting ports, when the rotor member is in seated relation to the body member, said means including ring-shaped elements projecting from one of said faces; and means for actuating the rotor member.

LEE G. DANIELS.